2 Sheets—Sheet 2.
G. BROOKS.
Fanning Mill.
No. 229,668. Patented July 6, 1880.
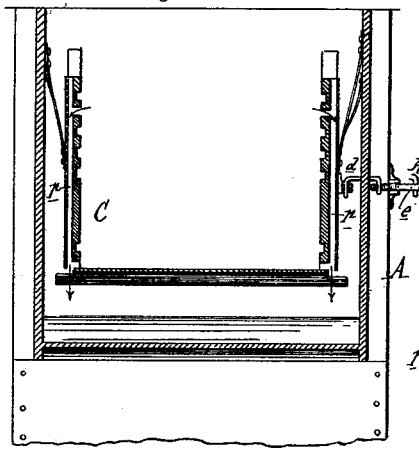
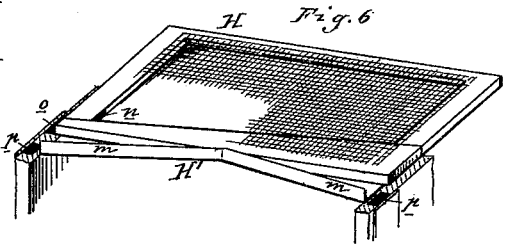
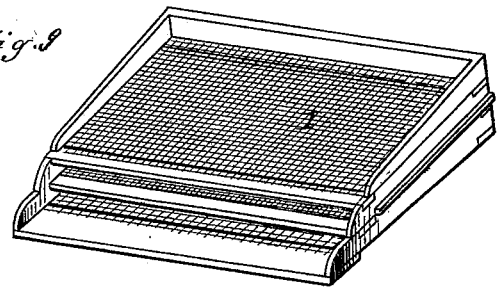
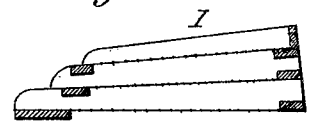
Attest:
A. Barthel
E. P. Sprague
Inventor:
George Brooks
By Atty
Thos. S. Sprague

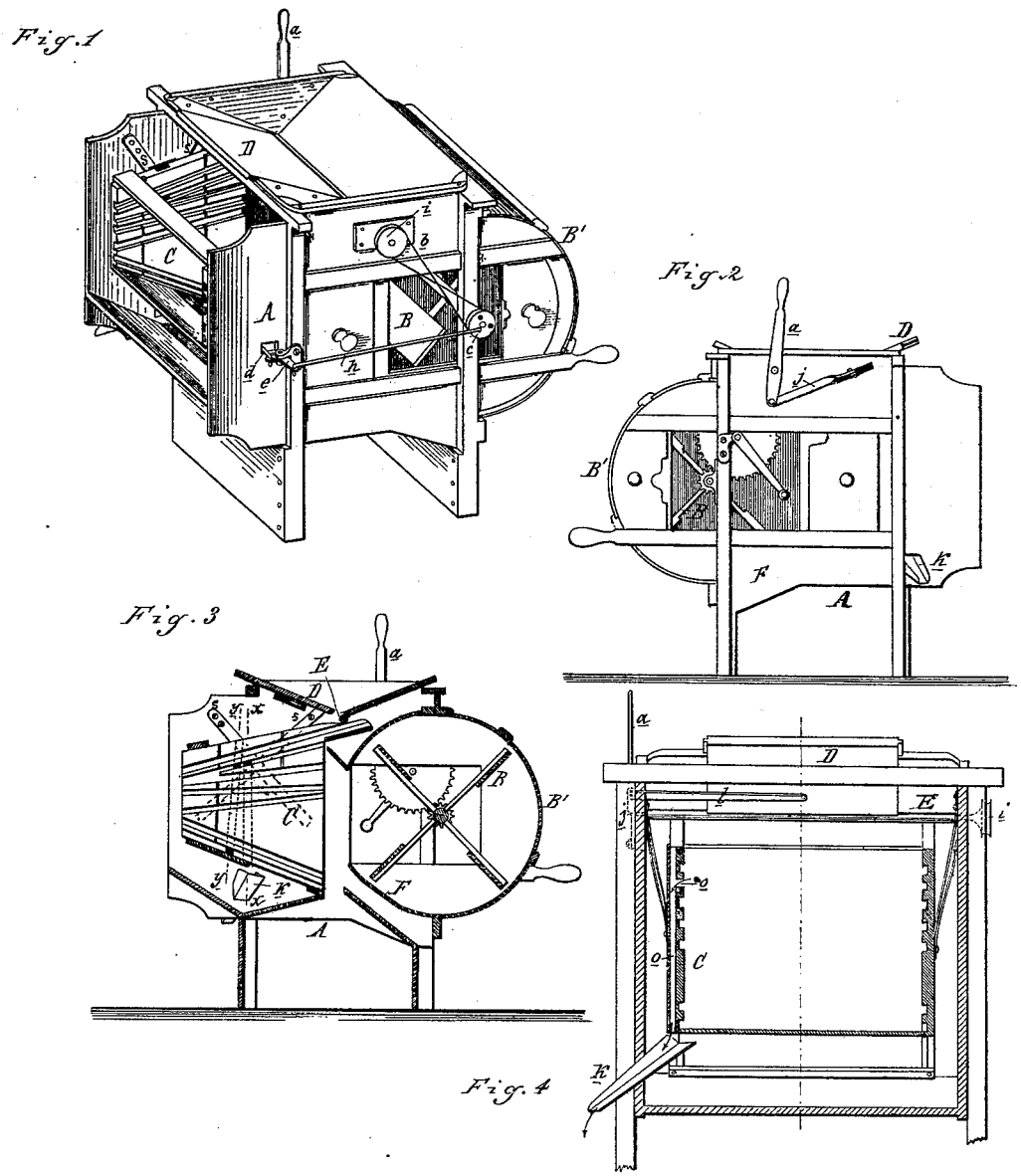

UNITED STATES PATENT OFFICE.

GEORGE BROOKS, OF DETROIT, MICHIGAN, ASSIGNOR OF TWO-THIRDS OF HIS RIGHT TO FRANK C. NALL, OF SAME PLACE.

FANNING-MILL.

SPECIFICATION forming part of Letters Patent No. 229,668, dated July 6, 1880.

Application filed July 10, 1879.

*To all whom it may concern:*

Be it known that I, GEORGE BROOKS, of Detroit, in the county of Wayne and State of Michigan, have invented an Improvement in Fanning-Mills, of which the following is a specification.

My invention relates to improvements in fanning-mills; and it consists in certain improvements therein, hereinafter more fully set forth, and pointed out in the claim.

In the drawings, Figure 1 is a perspective view. Fig. 2 is a side elevation. Fig. 3 is a vertical longitudinal section. Fig. 4 is a vertical cross-section. Fig. 5 is a similar view in another plane of section. Figs. 6 and 7 are detached views of the chess-board. Figs. 8 and 9 are detached views of the hurdle.

In the accompanying drawings, which form a part of this specification, A represents the case, B the fan, B' the fan-case, and C the shoe, of a fanning-mill, all of the ordinary construction, excepting as more fully hereinafter explained.

The fan-case being constructed upon a true circle from the center of the fan-shaft, its inner end, F, is carried inward and upward, terminating above the lower screens in the shoe C. This extension of the fan-case carries the draft or currents of air above the lower screens, blowing off chaff or other impurities, allowing the wheat or other grain to have a free run upon the screen to the discharge, while it compels a more concentrated action of the currents of air upon the upper screens, thus rendering them more effective in their operation.

Upon one end of the fan-shaft, outside the case, is secured a grooved pulley, c. In the outer face of this pulley are three or more apertures which are arranged eccentrically to the center. In one of these apertures is hooked one end of the shaker-rod $h$, the opposite end of which engages with one arm of the bell-crank lever $e$, which is properly pivoted in a bracket near the rear end of the machine, as shown. A link, $d$, connects the other end of the bell-crank lever to the shoe C, as in the ordinary manner. By these means I am enabled to give a greater or lesser lateral shaking movement to the shoe, as may be desired.

Below the mouth of the hopper I journal, in proper bearings, a feed-roller, E, which has secured to one end of its shaft a grooved pulley, $i$, which is driven by a belt or cord from the pulley $c$ upon the end of the fan-shaft. This roller operates as a feed to draw the grain through the mouth of the hopper and prevents clogging at that point. This roller E is placed below the stationary side of the hopper and on the side of the hopper-mouth next to the head of the upper screens. By being placed in this position the roller, in addition to preventing the clogging of the grain in the mouth of the hopper, prevents any of the grain from working over the upper end of the screen, which it would do in a machine of this kind when the hopper is full if the roller were placed on the opposite side of the hopper-mouth.

In one side of the hopper I place a slide, D, which is designed to regulate the flow of grain to the mill, and is operated by a lever, $a$, which is pivoted to the side of the case. The lower end of this lever is connected by a link, $j$, to the outer end of a lever, $l$, the inner end of which is secured to the under side of the slide D. By these means the operator can adjust the slide as he may desire without stopping the mill to make such adjustment.

H is a chess-board, which is composed of a fine screen and frame, to the bottom of which is secured a seed-board, H', which projects beyond the edge of the screen, and has its edge turned up, forming the gutters $m$. The front bar of the frame is made wedge shape in form, so that grass or other fine seed which may pass through the screen will be conducted to the opening $n$ in the side, and from thence pass down the channel $o$ in the side of the shoe to the spout $k$, and be delivered outside the mill. Such grain as passes over the screen falls into the gutters $m$, which conduct it to the channels $p$ in each side of the shoe, through which it is delivered into the chess-box.

The shoe C is suspended from the inner faces of the case A by means of two elastic straps, S, on each side of the shoe, (see Figs. 1 and 3,) secured to the inner faces of the casing near their opposite upper corners. The elastic straps S thence cross each other, two on each side of the shoe, and are secured at their lower ends to the lower opposite corners of the shoe C. By this construction the shoe is securely supported and allowed a free lateral play, and at the same time any longitudinal movement is prevented, so that the passages in the side of the shoe will always register with the discharge-spout K to deliver the chess, grass, or other seed outside the fanning-mill.

I is a hurdle, composed of three or more screens of different mesh, particularly designed for separating oats from wheat.

The operation of machines of this class is so well known that a further description is deemed unnecessary.

What I claim as my invention is—

The combination, in fanning-mills, of the shoe C, having the channels $o\ p$, with a chess-board having the inner face of its front bar inclined and provided with the screens H and opening $n$, and seed-board H', with oppositely-inclined gutters $m$, all constructed, arranged, and operated substantially as described.

In testimony whereof I hereunto set my hand this 2d day of June, 1879.

GEORGE BROOKS.

In presence of—
  H. S. SPRAGUE,
  A. BARTHEL.